United States Patent Office 2,696,403
Patented Dec. 7, 1954

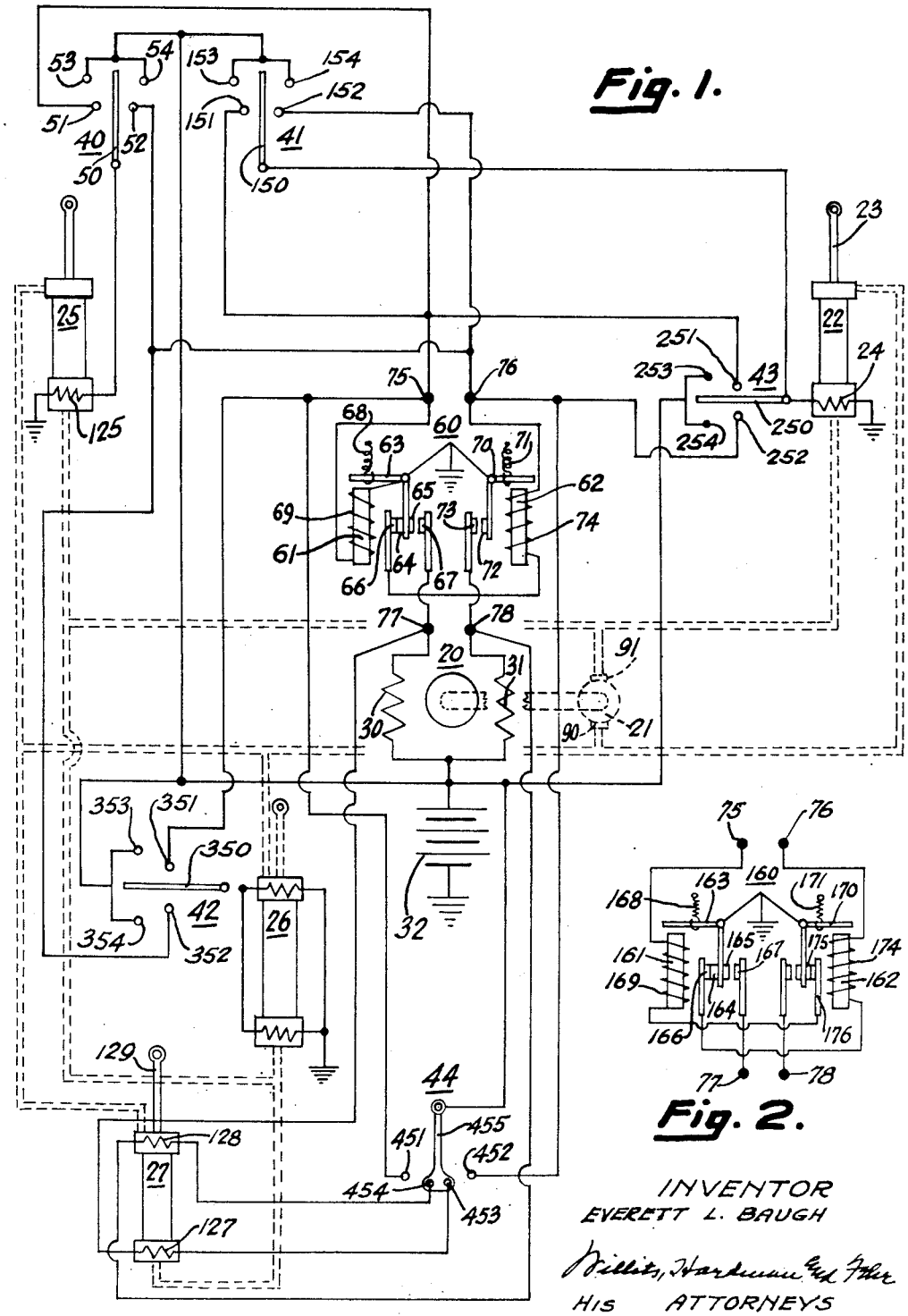

2,696,403

ELECTROHYDRAULIC CONTROL AND ACTUATING SYSTEM FOR VEHICLE TOPS, WINDOWS, AND SEATS

Everett L. Baugh, Miamisburg, Ohio, assignor to General Motors Corporation, Detroit, Mich., a corporation of Delaware Application October 25, 1950, Serial No. 192,081

4 Claims. (Cl. 296—44)

This invention relates to improvements in hydraulic actuating mechanisms or systems for raising or lowering closures, tops and the like and particularly to improvements in the controls for the various elements of the system.

Hydraulic actuating mechanism is used to raise and lower windows and tops of automobiles and to adjust the drivers seat. Such a mechanism or system comprises an actuator, generally a fluid motor connected to the device to be moved and energized by fluid pressure delivered by a fluid pump. Where the fluid motor is fluid pressure actuated in either direction, the pump is reversible and is driven by a reversible power unit as for instance a reversible electric motor.

It is among the objects of the present invention to provide control mechanism for preventing concurrent closing of opposing circuits through the reversible electric motor which drives the pump of the hydraulic actuating system.

In an automobile equipped with an hydraulic actuating system for raising and lowering the windows and top and for adjusting the drivers seat of the vehicle, it is the general practice to provide a control device for each element to be actuated, within easy reach and for the sole use of the driver of the vehicle. Duplicate control devices are provided for the windows adjacent the seats for passengers in the vehicle. Thus the driver may operate a control device to actuate one of these last mentioned windows while the passenger aside said particular window may actuate the duplicate control device for operating said window in the opposite direction at the same time.

Another object of the present invention is to provide a system of this kind with an automatic control device which gives precedence to one directional operation, preferably the operation for raising the windows, during which operation actuation of any control device to effect reverse or lowering movement of any window is completely ineffective.

A still further object of the present invention is to provide a top actuating and control mechanism which normally permits manual raising or lowering of the top especially in case of failure of any part of the hydraulic actuating mechanism, the top actuating mechanism being rendered ineffective when any other control mechanism is operated for actuating the other parts of the vehicle such as the windows and drivers seat.

Further objects and advantages of the present invention will be apparent from the following description, reference being had to the accompanying drawings, wherein a preferred embodiment of the present invention is clearly shown.

In the drawings:

Fig. 1 is a diagram illustrating schematically the preferred form of the present invention.

Fig. 2 is a fragmentary diagram of a modified form of one control element of the system.

Referring to the drawing, the electric motor 20 of the system is of the reversible type capable of operating in either direction. It is designed and constructed to drive a pump 21, shown in dotted lines in Fig. 1 and capable of delivering fluid under pressure from any suitable fluid reservoir to a fluid motor 22 which is one of a plurality of motors in the system. This fluid motor 22 is in the form of a cylinder containing a reciprocative piston the rod 23 attached to the piston being connectible to any device it is intended to operate, such as an automobile window, top, seat or any closure member. The pump has two outlets or ports 90 and 91, each acting as an inlet or an outlet port, depending upon the direction of rotation of the pump 21. One port is in communication with one end of the fluid motor cylinder while the other pump port is in communication with the opposite end of the fluid motor cylinder as shown by the dotted lines in Fig. 1. One end of said fluid motor cylinder is equipped with a normally closed valve which is opened by an electromagnet indicated at 24 when said magnet is energized. One of these fluid motors is provided in each door of the vehicle the window of which is to be raised or lowered by the device. For purposes of this description fluid motor 22 is in the right front door of the vehicle, motor 25 being in the left front door or directly aside the drivers seat. Another fluid motor 26 is mechanically connected to the drivers seat for adjusting it forwardly or rearwardly. The fluid motor 27 is operative to raise and lower the vehicle top. It differs from the other fluid motors in that the fluid control valves at each end thereof are normally open to permit manual operation of the top, but are closed by the electro-magnet when other controls are operated.

The electric motor 20 has two windings 30 and 31 each adapted, when energized, to cause the motor to rotate in a respective direction. Both windings 30 and 31 are connected with a source of electrical energy, a storage battery 32, one side of which is grounded. Let it be assumed that when winding 30 is energized, motor 20 will drive the pump 21 in a direction that causes said pump 21 to deliver fluid under pressure to the lower end of the cylinder motor 22 thus forcing the piston and its rod 23 upwardly and operating the window attached thereto into its up or closed position. When motor winding 31 is energized, the motor rotates the pump in the opposite direction and thus said pump 21 will deliver fluid under pressure to the upper end of the cylinder motor 22, urging the piston and its rod 23 downwardly and therefore its attached window into open position.

For purpose of simplicity, the present drawing illustrates only four fluid motors which might serve as a complete system in a two passenger or coupe convertible. The motor 22 would be in the right door of the vehicle to raise or lower the window therein, the motor 25 in the left door, aside of the drivers seat and for the same purpose, the motor 26 connected to the drivers seat for adjusting it, and motor 27 connected to the vehicle top for raising or lowering it. In a complete system for a five passenger convertible automobile similar fluid motors are provided in the two rear doors for window actuation. All fluid motors are operated and controlled individually and in a like manner. The fluid motors for the door windows each have at least one normally closed fluid valve which prevents window movement normally but which is adapted to be opened by an electromagnet concurrently energized with the energization of the electric motor that operates the pump. The fluid motor for the seat has a normally closed valve at each end thereof which normally locks the motor against operation to hold the seat rigid in adjusted position but which are opened by electromagnets when the motor is to be rendered active for seat adjusting purposes. The fluid motor for actuating the top has at least one normally open valve for permitting movement of the motor in response to manual operation of the top which may be necessary, particularly upon failure of any element of the hydraulic system or control device therefor. The normally open valve of the top actuating fluid motor is automatically closed by an electro-magnet which is energized in response to the actuation of any of the control devices governing the operation of the windows and seat actuators. This is done to prevent actuation of the top when any of these other devices are rendered operative. The valve or valves in the top actuating fluid motor are not actuated, but maintained open when the control device for actuating the top is operated to render the electric motor and its connected pump active.

For controlling the system, a bank of switches is provided in the vehicle so as to be accessible to the operator thereof. Duplicate individual switches are provided adjacent the right front and left and right rear doors of the vehicle. Switches 40, 41, 42 and 44 are four of the bank of switches accessible to the operator, switch 40 controlling the left front door motor 25, switch 41 controlling the right front door motor 22, switch 42 controlling seat adjustments by fluid motor 26. The switch 44 controls the operation of the top actuator motor 27. The switch 43, duplicate of switch 41, is for passenger control of fluid motor 22 in the right front door. Thus it will be understood that in a complete system duplicate control switches are provided for the fluid motors in the right front and left and right rear doors, one set of switches being available to the operator of the vehicle, the duplicate switches of the other set being individually available to the passengers adjacent the respective doors.

All control switches excepting the switch 44 being alike, only one will be described detailedly. For instance switch 40 has a movable bridging contact 50 which is electrically connected to the valve actuating magnet 125 of fluid motor 25, the one side of this magnet being grounded. Two stationary contacts 51 and 52 are normally not engaged by the contact 50, however, bridging contact may be moved to one side to engage contact 51 or to the other side of normal position to engage contact 52. The switch 40 has interconnected stationary contacts 53 and 54, the contact 53 being engaged by bridging contact 50 when said contact 50 engages contact 51 and likewise contacts 52 and 54 are concurrently engageable by the bridging contact 50.

The feature control instrument of the present control system is the relay or electromagnet controller switch designated as a whole by the numeral 60. It is a unitary structure consisting of two separate electromagnetically actuated circuit controllers or switches 61 and 62. Controller 61 consists of a pivoted armature 63, one part of which carries two oppositely disposed contacts 64 and 65. Two stationary contacts 66 and 67 are provided in this controller, the contact 66 being normally engaged by the armature contact 64 under the effect of a spring 68 attached to armature 63. Contact 67 is engageable by armature contact 65 when the electromagnet winding 69 of controller 61 is energized and attracts the armature. At this time contacts 64 and 66 are separated. Thus when electromagnet switch or controller 61 is in normal condition and not energized, contacts 64 and 66 are engaged and contacts 65 and 67 are separated. However, when controller 61 is energized by the closing of the electric circuit through its magnet winding 69, the armature is attracted and moved to cause contacts 64 and 66 to disengage and contact 65 is moved to engage contact 67.

The second electromagnetically actuated circuit controller 62 of the instrument 60 consists of a pivoted armature 70 yieldably urged by spring 71 so that the contact 72 on said armature is normally held out of engagement with its cooperating stationary contact 73. However, when the winding 74 of the electromagnet is energized by completion of the circuit in which said winding is connected, then armature 70 will be actuated to effect engagement of contact 72 with contact 73.

The unitary instrument 60 has four terminals 75, 76, 77 and 78. Terminal 75 has one end of the magnet winding 69 connected thereto, the other end of said winding being connected to the armature 63 which is grounded in any suitable manner. Terminal 75 is also connected to the contacts of all control switches 40, 41, 42, 43 and the like which correspond to the contact 51 of switch 40. The contact 451 of switch 44 is also connected to terminal 75. Terminal 76 has one end of the magnet winding 74 of magnet switch 62 connected thereto, the other end of said magnet winding being connected with stationary contact 66 of magnetic switch 61. Like armature 63, armature 70 of switch 62 is grounded. The terminal 76 is also connected to all manual switch contacts corresponding to the contact 52 of switch 40. The stationary contact 452 of the switch 44 is also electrically connected with the terminal 76. Terminal 77 to which one end of the electric motor winding 30 is connected is also connected to the stationary contact 67 of the controller 61 and to the one end of the electromagnet winding 127 of the valve at one end of fluid motor 27. The other end of this winding 127 is connected with the stationary terminal 453 of switch 44. The terminal 78 is electrically connected with the stationary contact 73 of controller 62, with the one end of electric motor winding 31 and with one end of the electromagnet winding 128 of the valve at the end of the fluid motor 27 opposite valve winding 127. The other end of winding 128 is connected with the stationary terminal 454 of switch 44. Both stationary terminals 453 and 454 are normally engaged and bridged by the manually movable contact 455 of switch 44 which, when moved in one direction, connects and bridges contacts 451 and 454 and disconnects contacts 455 and 453 and when moved out of normal position in the opposite direction connects and bridges contacts 452 and 453 of switch 44 and disconnects contacts 455 and 454. The movable contact 455 is connected to the source of electric power, the storage battery 32.

The interconnected stationary contacts of all manually operable control switches, corresponding to the contacts 53 and 54 of switch 40, are all connected to the ungrounded side of the source of electrical energy, the storage battery 32. The manually movable bridging contacts of all of these control switches, corresponding to the bridging contact 50 of switch 40, are electrically connected to the electromagnetically actuated fluid control valve or valves of the respective fluid motors 22, 25, 26 and other similar motors used but not illustrated.

*Method of operation*

Supposing the vehicle driver desires to lower the window in the door to his left, which has the fluid motor 25 installed therein. He actuates the movable switch member or bridging contact 50 clockwise as regards Fig. 1, and causes it to engage stationary contacts 52 and 54. Now the power source or battery 32 is in circuit connection with contacts 54, 52 and 50. The circuit through valve magnet 125 being completed, causes the normally closed fluid valve at the end of cylinder motor 25 to be opened to permit fluid movement into and out of cylinder 25. The now live contact 52, being connected to terminal 76 will cause current to flow through the magnet winding 74 of magnet controller or switch 62 thence across the engaging contacts 66 and 64 of magnet switch 61, back to the battery via the armature 63 and ground connections. Current flowing through winding 74 will energize the magnet to attract and move the armature 70 so that its contact 72 engages contact 73. When these contacts 72 and 73 engage, current from the battery 32 will flow through electric motor winding 31, terminal 78, across contacts 73 and 72, armature 70 and back to the grounded side of said battery. Now the electric motor rotates to operate the pump 21 in a direction so that it discharges fluid under pressure from pump port 90, through the dotted line conduit to the top end of cylinder motor 25 causing the piston therein to be moved downwardly and lower the window and also force the fluid beneath the piston to return to the pump 21 through the valve now held open under the influence of the energized magnet winding 125.

Operation of the member 150 of the drivers switch 41, to engage contacts 152 and 154 will complete the same circuits through the instrument 60 and motor 20 to operate the pump 21 and energize valve magnet 24 of the fluid motor 22 for delivering fluid under pressure to the upper end of cylinder motor 22 thereby lowering the window in the right front door of the vehicle. Fluid motor 22 will be operated in the same manner, when the member 250 is moved to engage contacts 252 and 254 and close the same circuits through the switch 62 and electric motor 20. Likewise fluid motor 26 will be similarly operated upon the engagement of contacts 352 and 354 by contact 350 of switch 42.

As has been stated heretofore, the electromagnetically actuated valves of all fluid motors excepting the fluid motor for actuating the top are normally closed and must be opened to permit fluid to be directed into them by the pump. The valves in the top actuating fluid motor are normally open to permit manual actuation of the top in case the battery or any other electrical device of the system fails. If, during the operation of any of the window or seat actuating fluid motors, as described in the aforegoing paragraph, the valves controlled by windings 127 and 128 of the top actuating fluid motor 27 were to be left open, as they normally are, the pump could deliver fluid into the fluid motor 27 and actuate it so that the top would be actuated each time a window or the seat is actuated. Therefore it is necessary to energize windings 127 and/or 128 to close the normally open valves associated therewith and render the fluid motor inoperative whenever a window or seat actuating fluid motor is rendered active. To do this winding 127 is in circuit with terminal 77 and winding 128 is in circuit with terminal 78, both windings being normally connected with the battery 32 through contacts 453 and 454 normally bridged by movable contact 455 of switch 44 which movable contact is connected to the battery. Thus when terminal 77 is grounded by engagement of contacts 65 and 67 to effect raising operation of any of the windows or adjustment of the seat in one direction, the circuit through winding 127 of top actuating motor 27 is completed, causing the valve at this end of the fluid motor 27 to be closed to prevent fluid from entering said fluid motor and actuating it. Similarly, when terminal 78 is grounded through engaging contacts 72 and 73 to effect motor and pump operation in one direction for operating a window or the seat, the circuit through the valve winding 128 of the fluid motor is completed to close its associated valve and thus render the fluid motor 27 inoperative.

To raise the top, the operator actuates the movable contact 455 of switch 44 clockwise as regards Fig. 1 whereby contact 453 will be disengaged and contacts 451 and 454 are bridged by contact 455. Now current from the battery flows through contact 455, contacts 454 and 451 to terminal 75 then through magnet winding 69, armature 63 back to the battery via the ground connections. This energizes magnet switch 61 to open contacts 64—66 and close contacts 65—67 which grounds terminal 77 to effect energization of the motor winding 30 and operation of the pump to deliver fluid under pressure to the lower end of fluid motor 27 whereby the piston and rod 129 thereof will be moved outwardly of the cylinder to raise the top. It will be noted that at this time neither winding 127 nor 128 of the respective valves in the fluid motor are energized and thus the fluid motor may be activated. When the top is to be lowered contact 455 is moved to bridge contacts 452 and 453 which activate magnetic switch 62 to cause the electric motor 20 to operate pump 21 so that fluid is delivered to the upper end of fluid motor 27 and retract the rod 129 thereof.

When the operator of the vehicle desires to raise the window in the left front door, he moves contact 50 to engage contacts 51 and 53 of switch 40. This energizes the valve magnet 125 to open the valve in fluid motor 25. Current now will flow from the battery to contacts 53 and 51 bridged by contact 50, thence to terminal 75 through magnet winding 69 to armature 63 and via ground back to the battery 32. This circuit effects operation of armature 63 to cause engagement of contacts 65 and 67 and at the same time separates contacts 64 and 66. Now current from the battery flows through motor winding 30 to terminal 77, across contacts 67—65, armature 63 back to the battery via the ground connections, resulting in the rotation of the motor 20 and its connected pump 21 in the opposite direction. The pump 21, now rotating in this opposite direction, delivers fluid under pressure from its port 91 to the lower end of the fluid motor cylinder 25 causing the piston therein to be moved upwardly as regards Fig. 1. In this case pump port 90, acting as the intake port, receives fluid discharged from cylinder motor 25 by its upwardly moving piston. It will be noted that while contacts 64 and 66 are separated, magnet winding 74 cannot be energized for contacts 64 and 66 are in the circuit of said winding and thus need to be in engagement to energize said winding 74.

The motor 20 and its connected pump 21 will be rotated in this opposite direction so that the pump port 91 acts as the fluid pressure discharge port, when the movable contacts of the several manual switches are moved to bridge the stationary contacts as follows: switch 41, contact 150 into engagement with contacts 151—153 for fluid motor 22; switch 43, contact 250 into engagement with contacts 251—253 for the fluid motor 22; switch 42, contact 350 into engagement with contacts 351—353 for fluid motor 26. This causes raising of the respective windows and movement of seat in one direction, dependent upon what control switch is operated.

As has been mentioned, the feature of the present invention is to give preference or precedence to the raising of the windows over the lowering thereof. Duplicate control switches for the right front and left and right rear door windows are provided, one set of switches in a bank, available to the vehicle operator and a duplicate switch at each door for the respective passengers. Fig. 1 for the sake of clarity and simplicity only illustrates duplicate switch arrangements for the right front door. These switches are, switch 41 in the drivers bank of switches, and switch 43, at the right front door for the passenger.

Supposing the driver desires to have the window in the right front door open. To lower it he actuates switch contact 150 of switch 41 so that it engages contacts 152—154. Now the electromagnet 24 is energized to open the valve in fluid motor 22, and the electromagnetic switch 62 with its magnet winding 74 is energized due to the fact that the circuit of said winding is completed by the engagement of contacts 64—66 of the companion electromagnetic switch 61. The circuit through motor winding 31 will be completed when contacts 72 and 73 are engaged through actuation of the armature 70 by the energized electromagnet 74 and consequently the motor operates to rotate pump 21 so that it delivers fluid under pressure from its port 90 into the fluid motor cylinder 22 above the piston therein. While the window is thus being lowered by rod 23 of fluid motor 22, the passenger at the right front door decides he wants the window up contrary to the wishes of the driver and therefore he actuates contact 250 of switch 43 into engagement with the contacts 251—253. This connects the battery 32 with terminal 75 of the control instrument 60 and completes the circuit through the winding 69 of magnet switch 61. When the electromagnet 69 is thus energized, it actuates armature 63 to open or disengage contacts 64—66 and close or engage contacts 65—67. Opening contacts 64—66 interrupts or breaks the circuit of electromagnet 74 of switch 62, causing its deenergization, release of armature 70, and consequent opening of its contacts 72—73. This renders the motor winding 31 ineffective and thus, even though the drivers switch 41 is held in a position tending to render motor winding 31 effective, the passengers switch 43, when in its window raising position as aforedescribed, will have precedence because contacts 65 and 67 are consequently engaged to effect closing of the motor circuit through motor winding 30 which energizes the pump 21 to deliver fluid under pressure from its port 91 to the bottom end of fluid motor cylinder 22 to urge the piston therein upwardly and close the window in the right front door. This same preference to closing operations is given the passenger switches at the left and right rear door over the duplicate switches in the driver bank and vice versa, that is, the driver may effectively actuate one of the bank switches to window closing position even though the duplicate passenger switch is operated to lower the respective door window. In this closing instance the passengers switches at the respective doors are subservient to the drivers switches.

Thus electromagnetic switch 62 is dependent upon the magnetic switch 61 for rendering the electric motor operative in one direction whereas electromagnetic switch 61 is independent of and has precedence over magnetic switch 62 for rendering the electric motor operative in the opposite direction.

In some instances it may be desirable to have each magnetic switch 61 or 62 of the instrument 60 dependent upon its companion switch to render it effective for motor operation. Fig. 2 illustrates a modified form of control instrument 160. Like instrument 60 it has four terminals 75, 76, 77, 78 connected in circuits as shown in Fig. 1. Two companion electromagnetic switches 161 and 162 are in this instrument 160. Switch 161 has an electromagnet winding 169 adapted, when energized to attract and move the pivoted armature 163 against the effect of spring 168. Armature 163 has two contacts 164 and 165 secured to opposite sides of an angular arm thereof. Contact 164 normally engages stationary contact 166 which is electrically connected to the winding 174 of the electromagnet of companion switch 162, said winding 174 also being connected with the terminal 76. The contact 165 is normally disengaged form, but may engage contact 167 when the electromagnet winding 169 is energized to actuate armature 163 and separate contacts 164—166. Contact 167 is connected with terminal 77.

The electromagnet winding 174 of switch 162, when energized effects operation of armature 170 against the effect of spring 171 to move contact 175 on said armature out of normal engagement with contact 176 which is electrically connected to the winding 169 of switch 161. In response to this movement of the armature 170, its contact 172 is moved to engage contact 173 which is connected to terminal 78. Both armatures 163 and 170 are grounded. With this instrument 160 replacing instrument 60 in the system shown in Fig. 1, the upward movement precedence aforedescribed is eliminated. The two companion switches 161 and 162 of instrument 160 are both dependent one on the other to effect motor operation. When one switch is energized and actuated to effect motor operation in one direction, the companion switch is rendered ineffective to be energized and close motor circuits. Therefore until one switch is completely deenergized and returned to normal condition, the other companion switch is inoperative or incapable of being energized.

From the aforegoing it may be seen that the present invention provides for motor protection as it eliminates the possibility of establishing opposing circuits through the electric motor. It gives precedence to the raising or closing of all windows over the lowering or opening thereof; and permits manual operation of the vehicle top in case of any failure of the system for mechanically actuating the top up or down.

While the embodiment of the present invention as herein disclosed constitutes a preferred form, it is to be understood that other forms might be adopted.

What is claimed is as follows:

1. An electrically controlled actuator mechanism for effecting translation of movable components of an automobile, comprising, a plurality of fluid motors each adapted respectively for connection to a movable component of the automobile for actuating the same, a reversible fluid pump in fluid flow communication with each fluid motor for operation thereof in either of opposite directions, a reversible electric motor drivingly connected to said pump, two electromagnetically actuated controllers electrically in circuit with said electric motor and separately energizable to connect the electric motor with a source of electric power, one of said controllers effecting electric motor operation in one direction and the other controller effecting operation in the opposite direction, a duplicate pair of switches for each fluid motor to effect operation thereof, one switch of each pair of switches forming a unit of a switch bank and the other switch of each pair being adjacent a component to be actuated, said switches being electrically in circuit with both controllers and manually operative from a neutral position into one or another of two positions to connect one or the other controller with the power source to effect operation of the electric motor in one or the other direction, each duplicate pair of switches being electrically connected with said controllers such that one of the pair of switches maintains control preference over the other of the pair of switches to effect operation of said controllers to maintain preferential control of the electric motor in one direction by the said one switch.

2. An electrically controlled actuator mechanism for effecting translation of movable components of an automobile, comprising, a plurality of fluid motors each adapted respectively for connection to a movable component of the automobile for actuating the same, a reversible fluid pump in fluid flow communication with each fluid motor for operation thereof in either of opposite directions, a reversible electric motor drivingly connected to said pump, two electromagnetically actuated controllers electrically in circuit with said electric motor and separately energizable to connect the electric motor with a source of electric power, one of said controllers effecting electric motor operation in one direction and the other controller effecting operation in the opposite direction, a duplicate pair of switches for each fluid motor to effect operation thereof, one switch of each pair of switches forming a unit of a switch bank and the other switch of each pair being adjacent a component to be actuated, said switches being electrically in circuit with both controllers and manually operative from a neutral position into one or another of two positions to connect one or the other controller with the power source to effect operation of the electric motor in one or the other direction, each duplicate pair of switches being electrically connected with said controllers such that one of the pair of switches maintains control preference over the other of the pair of switches to effect operation of said controllers to maintain preferential control of the electric motor in one direction by the said one switch, and an electromagnetically operated normally closed valve controlling fluid flow to each of said fluid motors and electrically connected with a respective pair of switches for energization of the electromagnetically operated valve to open the same irrespective of which switch of the said pair closes electric circuit to the said valve whereby to open communication between the pump and the fluid motor.

3. An electrically controlled actuator mechanism for raising or lowering the windows of an automobile, comprising, a fluid motor adapted for connection to each window for operation thereof, a reversible fluid pump in fluid flow communication with each fluid motor for operation of the same in either of opposite directions, a reversible electric motor drivingly connected to said pump, two electromagnetically actuated controllers electrically interconnected so that one of said controllers is energizable independently of the other and when so energized is operative to render the other controller inoperative, said controllers being connected with said electric motor to separately effect operation of the electric motor in one direction or the other, a duplicate pair of switches for each fluid motor to effect operation thereof, one switch of each pair of switches forming a unit of a switch bank and the other switch of each pair being adjacent the window to be actuated, said switches being electrically in circuit with both controllers and manually operative from a neutral position into one or another of two positions to connect one or the other controller with a power source to effect operation of the electric motor in one or the other direction, each duplicate pair of switches being electrically connected with said controllers such that the switches adjacent the respective windows of the automobile maintain control preference over the other of the pair of switches to effect operation of the one controller whereby to render the said other controller inoperative to thereby maintain preferential control of the electric motor by the said one controller in one direction of operation, and an electromagnetically operated normally closed valve controlling fluid flow to each of said fluid motors and electrically connected with a respective pair of switches for energization of the electromagnetically operated valve to open the same irrespective of which switch of the said pair closes electric circuit to the said valve whereby to open communication between the pump and the fluid motor.

4. An electrically controlled actuator mechanism for raising or lowering the windows of an automobile and for raising and lowering the top thereof, comprising, a fluid motor adapted for connection to each window of the automobile, a normally closed electromagnetically operated control valve connected with each of said fluid motor for regulating flow of fluid relative thereto, another fluid motor adapted for connection to the top for operating the same, a reversible fluid pump in fluid flow communication with each fluid motor for operation of the same in either of opposite directions, a reversible electric motor drivingly connected to said pump, normally open electromagnetically operated valves associated with said top motor for regulating flow of fluid relative thereto, two electromagnetically actuated controllers electrically connected in circuit with said electric motor and separately energizable to connect the electric motor with a source of electric power, said controllers being so connected that one of them is energizable independent of the other and when so energized renders the other controller inoperative, a duplicate pair of switches for each window fluid motor to effect operation thereof, one switch of each pair of switches forming a unit of a switch bank and the other switch of each pair being adjacent a window to be actuated, said switches being electrically in circuit with both controllers and manually operative from a neutral position to one or another of two positions to connect one or the other controller to a power source to effect operation of the electric motor in one or the other direction, each duplicate pair of switches being electrically connected with said controllers such that the electric switch adjacent a window maintains control preference over the other of the pair of switches to effect operation of the one controller to render the other inoperative and thereby maintain preferential control of the direction of rotation of the electric motor by the said one switch, and other switch means electrically in circuit with said valves for said top motor and electrically in circuit with said controllers whereby to energize the said valves for said top motor to close the same when either of said controllers are rendered active by actuation of either of the aforesaid pairs of switches.

(References on following page)

References Cited in the file of this patent

UNITED STATES PATENTS

| Number | Name | Date |
|---|---|---|
| 2,005,195 | McCabe | June 18, 1935 |
| 2,128,849 | Redfern | Aug. 30, 1938 |
| 2,329,802 | Westrope | Sept. 21, 1943 |
| 2,331,603 | Falcon | Oct. 12, 1943 |
| 2,405,769 | Stoner | Aug. 13, 1946 |
| 2,417,795 | Yardeny et al. | Mar. 18, 1947 |
| 2,425,391 | Parsons | Aug. 12, 1947 |
| 2,509,623 | Baade | May 30, 1950 |
| 2,617,972 | Nutter | Nov. 11, 1952 |
| 2,622,400 | Greer | Dec. 23, 1952 |

OTHER REFERENCES

Chiltons Motor Age, pp. 84, 85, 172, 174, 176 and 177, January 1952.